US009276472B2

(12) United States Patent
Ooga

(10) Patent No.: US 9,276,472 B2
(45) Date of Patent: Mar. 1, 2016

(54) DC/DC CONVERTER AND DISPLAY DEVICE INCLUDING THE SAME

(71) Applicant: NLT Technologies, Ltd., Kanagawa (JP)

(72) Inventor: Kouichi Ooga, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 201 days.

(21) Appl. No.: 14/089,005

(22) Filed: Nov. 25, 2013

(65) Prior Publication Data

US 2014/0167717 A1 Jun. 19, 2014

(30) Foreign Application Priority Data

Dec. 14, 2012 (JP) ................................. 2012-274114

(51) Int. Cl.
*G05F 1/46* (2006.01)
*H02M 3/158* (2006.01)
*G05F 1/563* (2006.01)
*H02M 1/44* (2007.01)

(52) U.S. Cl.
CPC ............... *H02M 3/158* (2013.01); *G05F 1/467* (2013.01); *G05F 1/563* (2013.01); *H02M 1/44* (2013.01)

(58) Field of Classification Search
CPC ........... G06F 1/46; G06F 1/467; G06F 1/563; G06F 1/575
USPC .......... 323/222–225, 268, 271, 272, 282, 285
See application file for complete search history.

(56) References Cited

U.S. PATENT DOCUMENTS

| 5,945,820 A | * | 8/1999 | Namgoong et al. | ........... 323/282 |
| 6,128,206 A | * | 10/2000 | Sun et al. | ...................... 363/127 |
| 6,272,024 B2 | * | 8/2001 | Uchida | ...................... 363/21.12 |
| 6,674,356 B2 | * | 1/2004 | Naito et al. | ................... 336/212 |
| 2008/0205888 A1 | | 8/2008 | Noguchi et al. | |
| 2011/0228569 A1 | * | 9/2011 | Zheng et al. | ............... 363/21.12 |

FOREIGN PATENT DOCUMENTS

| JP | 05-56306 | 3/1993 |
| JP | 2003-061355 | 2/2003 |
| JP | 2005-117852 | 4/2005 |
| JP | 2008-203784 | 9/2008 |
| JP | 2011-055695 | 3/2011 |

* cited by examiner

*Primary Examiner* — Matthew Nguyen
(74) *Attorney, Agent, or Firm* — Young & Thompson

(57) ABSTRACT

The present invention is directed to sufficiently reduce the level of EMI which occurs from a switching FET in a DC/DC converter and minimize deterioration in efficiency of a power supply. A DC/DC converter includes a switching circuit for driving a switching FET for increasing or decreasing voltage, and a switching circuit for driving a ringing frequency changing circuit. One end of a capacitor is connected to a drain of the switching FET for increasing or decreasing voltage, and the other end of the capacitor is connected to a drain of an FET for the ringing frequency changing circuit. A source of the FET for the ringing frequency changing circuit is connected to GND, and a control circuit is provided which makes the ringing frequency changing circuit valid so that a ringing frequency becomes low only in a ringing frequency component exerting large influence on deterioration in EMI.

9 Claims, 18 Drawing Sheets

DC/DC CONVERTER AND DISPLAY DEVICE INCLUDING THE SAME

BACKGROUND

1. Technical Field

The present invention relates to a DC/DC converter and a display device including the same and, more particularly, to a DC/DC converter, in the case where the DC/DC converter is constructed by a switching circuit, in which deterioration in efficiency of the DC/DC converter is minimized and EMI is also reduced and a display device including the same.

2. Background Art

In recent years, as the panel of a thin display device becomes larger and comes to have higher resolution (higher definition), the transmission frequency of a video signal in the device is increasing. As the size becomes larger and the resolution becomes higher, unnecessary radiation (EMI: Electromagnetic Interference) generated from the display device also becomes larger.

As radiant sources of EMI, there are noises of an IC for outputting a clock signal on a signal processing board (printed board) on which circuit parts for driving a display device are mounted and a power supply circuit necessary to drive the IC.

Particularly, the case where the power supply circuit is constructed by a switching power supply will be considered. When a switching method is used at the time of converting voltage in the power supply circuit (DC/DC converter circuit), designing can be made with relatively high efficiency. Consequently, the switching power supply circuit is a circuit system which is often used.

It is, however, known that in the circuit configuration of the switching power supply circuit, necessary voltage is generated by switching, so that voltage fluctuation (ringing) having a certain frequency component occurs at the moment of on/off switching, and the voltage fluctuation is the cause of occurrence of unnecessary noise.

There is also the possibility that the unnecessary noise component of the ringing is largely influenced by resonance frequency of the printed board itself and the unnecessary noise component is increased.

With respect to EMI, the limit value on the permissible level of noise is determined for each frequency, and all of noise levels in a specified frequency band have to be set to the limit value or less. Obviously, the lower the noise level, the better. Therefore, as will be described later, a technique of reducing EMI even in the case of using a switching power supply is known.

The conventional technique of patent literature 1 relates to a drive circuit for a semiconductor optical amplifier gate switch, a semiconductor optical amplifier gate switch device, and an optical switching device and, particularly, is directed to reduce a ringing component by inserting a diode at a post stage of an inductor (refer to FIG. 14).

However, since the ringing frequency itself which worsens EMI cannot be changed by the diode, there is a problem such that a sufficient EMI reduction effect cannot be obtained.

The conventional technique of patent literature 2 relates to a switching power supply device and, particularly, is directed to reduce ringing at the time of switching by providing snubber circuits at both ends of an inductor (transformer) (refer to FIG. 15).

In the configuration of the conventional technique, however, since the snubber circuits always operate at the time of switching, the efficiency of the power supply is worsened.

In addition, the ringing frequency component which worsens EMI cannot be sufficiently eliminated by the snubber circuit, and there is consequently a problem such that a sufficient EMI reduction effect cannot be obtained.

The conventional technique of patent literature 3 relates to a self-excited DC/DC converter and, more particularly, provides a self-excited DC/DC converter which suppresses ringing by extending an off period of a switching element and can suppress increase in the frequency at the time of low load and contribute to improvement in efficiency at the time of low load (refer to FIG. 16).

However, the ringing mentioned in the conventional technique is ringing which is about a few times as high as oscillation frequency generated at the time of low load but is not ringing which is a few hundreds times to a few thousands times as large as that which occurs at the on/off timings of the oscillation frequency. Since a ringing frequency component in the band of tens or hundreds MHz which exert largest influence on EMI cannot be eliminated, there is, consequently, a problem that the EMI reduction effect cannot be obtained.

The conventional technique of patent literature 4 relates to a drive circuit of a voltage driving element and, more particularly, to a technique of providing a snubber circuit between a load such as a three-phase inverter and an input Vin, sending a feedback (F/B) to the input, and making gate opening/closing at the time of switching dull, thereby reducing ringing (refer to FIG. 17).

In the conventional technique, however, two protection diodes and three snubber resistors are necessary in addition to the present invention.

In the configuration of the conventional technique, in the case where the snubber circuit operates at the time of switching, a loss due to the snubber resistor occurs, so that the efficiency deterioration is caused.

Further, due to the method of eliminating ringing by feeding back (F/B) the voltage fluctuation in the load to the input to make the opening/closing timing of the gate of the switching FET dull, the efficiency deterioration becomes larger by the gate opening/closing timing.

In addition, by sending an F/B of the load to the input line, there is the possibility that noise having a ringing component is diffused into the input line.

The conventional technique of the patent literature 5 relates to an adaptive ringing suppressing device. In the configuration of the conventional technique, ringing is reduced by using a low-pass filter circuit including a delay circuit (refer to FIG. 18). By using the low-pass filter in a video signal processing circuit for a video signal or the like including a ringing component, the ringing component is eliminated.

However, the conventional technique does not eliminate a ringing component in a place where ringing occurs but an output from which the ringing component is eliminated as a result of passing through circuits is obtained.

That is, there is a part of an output of a single delay circuit, which is transmitted to the next stage while including the ringing component. The ringing component cannot be fundamentally eliminated. Even when the method of the conventional technique is applied, EMI cannot be reduced.

LITERATURE OF BACKGROUND ART

Patent Literature

Patent Literature 1: Japanese Unexamined Patent Application Publication No. 2008-203784

Patent Literature 2: Japanese Unexamined Patent Application Publication No. 2005-117852
Patent Literature 3: Japanese Unexamined Patent Application Publication No. 2003-61355
Patent Literature 4: Japanese Unexamined Patent Application Publication No. 2011-55695
Patent Literature 5: Japanese Unexamined Patent Application Publication No. H05-56306

SUMMARY OF THE INVENTION

In the case where the DC/DC converter is constructed by a switching circuit, rising or falling ringing occurs at the on/off timing of a switching FET. When there is a ringing component, the frequency component of the ringing becomes a noise source and EMI deteriorates.

As a method of reducing the ringing component, as described in the conventional technique of patent literature 1, a method of inserting a diode between a drain and a source of a switching FET and reducing an undershoot component is known.

However, in the diode, the undershoot component is reduced, but the frequency component of ringing does not disappear, and there is the case where a sufficient EMI reduction effect cannot be obtained.

That is, in the conventional technique, the ringing amount can be reduced but the frequency component in the ringing cannot be sufficiently changed, so that the EMI level cannot be still sufficiently reduced.

Therefore, for example, even when the ringing amount is reduced to be small, in the case where the value is close to the resonance frequency of the printed board, there is the possibility that the ringing is increased.

On the other hand, a concrete best method of changing the frequency component is to directly insert a capacitor between the drain and the source of the switching FET as described in the conventional technique of the patent literature 2.

When a capacitor is inserted between a switching power supply line in which ringing occurs and GND (to be precise, between the drain and the source of the switching FET), the time constant at the rising/falling in a switching waveform changes due to the resistance component of a parasitic resistance or the like in the transmission line and the inserted capacitor (although the switching waveform is of a rectangular wave, the rising/falling in the rectangular wave becomes dull) and, accompanying the change, the frequency component of the ringing also changes.

However, when the capacitor is simply inserted between the drain and the source of the switching FET, the switching waveform itself becomes dull, and a problem occurs such that the efficiency of the power supply (DC/DC converter) is largely deteriorated.

To solve the problems, an object of the present invention is, therefore, to sufficiently reduce the level of EMI occurring from a switching FET and minimize deterioration in the efficiency of a power supply (DC/DC converter).

To solve the problems, a DC/DC converter of the present invention includes a switching circuit for driving a switching FET for increasing or decreasing voltage, and a switching circuit for driving a ringing frequency changing circuit. One end of a capacitor is connected to a drain of the switching FET for increasing or decreasing voltage, the other end of the capacitor is connected to a drain of an FET for the ringing frequency changing circuit, a source of the FET for the ringing frequency changing circuit is connected to GND, and a control circuit is provided which makes the ringing frequency changing circuit valid so that a ringing frequency becomes low only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

The ringing frequency changing circuit includes a capacitor, the FET, and a switching circuit for driving the FET, and the control circuit is provided which controls a control timing of the switching circuit so that, at the time point when a drain-source voltage of the switching FET for increasing or decreasing voltage shifts from a high potential side to a low potential side and reaches the low potential, the capacitor is connected between the drain and the source of the switching FET and, in a period that the switching FET for increasing or decreasing voltage shifts from the low potential side to the high potential side, the capacitor is not connected between the drain and the source of the switching FET.

The ringing frequency changing circuit includes a capacitor, the FET, and a switching circuit for driving the FET, and the control circuit is provided which controls a control timing of the switching circuit so that, at the time point when a drain-source voltage of the switching FET for increasing or decreasing voltage shifts from a low potential side to a high potential side and reaches the high potential, the capacitor is connected between the drain and the source of the switching FET and, in a period that the switching FET for increasing or decreasing voltage shifts from the high potential side to the low potential side, the capacitor is not connected between the drain and the source of the switching FET.

Another DC/DC converter of the present invention includes a switching circuit for driving a switching FET for increasing or decreasing voltage, and a switching circuit for driving a ringing frequency changing circuit. One end of a capacitor is connected to a drain of the switching FET for increasing or decreasing voltage, the other end of the capacitor is connected to a drain of an FET for the ringing frequency changing circuit, a source of the FET for the ringing frequency changing circuit is connected to GND, a switching circuit for driving the ringing frequency changing circuit is constructed by a delay circuit for delaying a timing by a predetermined period using the switching circuit for driving the switching FET for increasing or decreasing voltage as a reference, and a control circuit is provided which makes the ringing frequency changing circuit valid so that a ringing frequency becomes low only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

The ringing frequency changing circuit includes a capacitor, the FET, and a switching circuit for driving the FET, and the control circuit is provided which controls a control timing of the switching circuit so that, at the time point when a drain-source voltage of the switching FET for increasing or decreasing voltage shifts from a high potential side to a low potential side and reaches the low potential, the capacitor is connected between the drain and the source of the switching FET and, in a period that the switching FET for increasing or decreasing voltage shifts from the low potential side to the high potential side, the capacitor is not connected between the drain and the source of the switching FET.

The ringing frequency changing circuit includes a capacitor, the FET, and a switching circuit for driving the FET, and the control circuit is provided which controls a control timing of the switching circuit so that, at the time point when a drain-source voltage of the switching FET for increasing or decreasing voltage shifts from a low potential side to a high potential side and reaches the high potential, the capacitor is connected between the drain and the source of the switching FET and, in a period that the switching FET for increasing or decreasing voltage shifts from the high potential side to the low potential side, the capacitor is not connected between the drain and the source of the switching FET.

In addition, the DC/DC converter of the present invention may make the ringing frequency changing circuit valid so that a ringing frequency becomes sufficiently lower than the resonance frequency of a printed board only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

Further, a display device including any of the above-described DC/DC converters may be also provided.

By providing the DC/DC converter of the present invention with the control circuit which does not make the capacitor for changing the frequency component of ringing always operated but changes only the frequency component of the ringing in a part exerting influence mainly on deterioration in EMI, deterioration in efficiency of the DC/DC converter is minimized, and EMI can be also reduced.

In particular, the present invention does not need a snubber resistor and a diode for input F/B protection, so that there is an effect that the number of parts is reduced as compared with that of the conventional technique as described in the patent literature 4.

With the configuration, noise is made to escape to GND with minimum distance from a noise generation source by using the capacitor for GND closest to the part where ringing occurs. Consequently, noise is not diffused to the power supply line or the like, and the gate opening/closing operation itself of the switching FET is not controlled, so that the efficiency deterioration can be minimized.

EMBODIMENTS OF THE PRESENT INVENTION

Hereinafter, a DC/DC converter of the embodiments will be described with reference to the drawings.

First Embodiment

Figure 13:
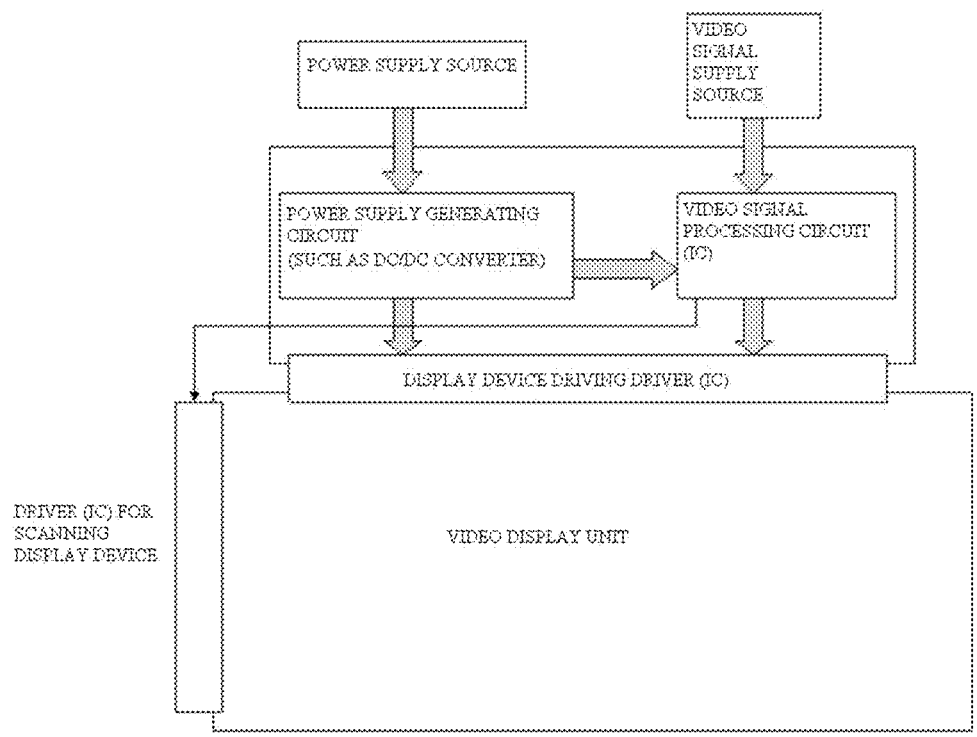
FIG. 13 illustrates an example of a general block diagram in a display device of the present invention.
Figure 14:
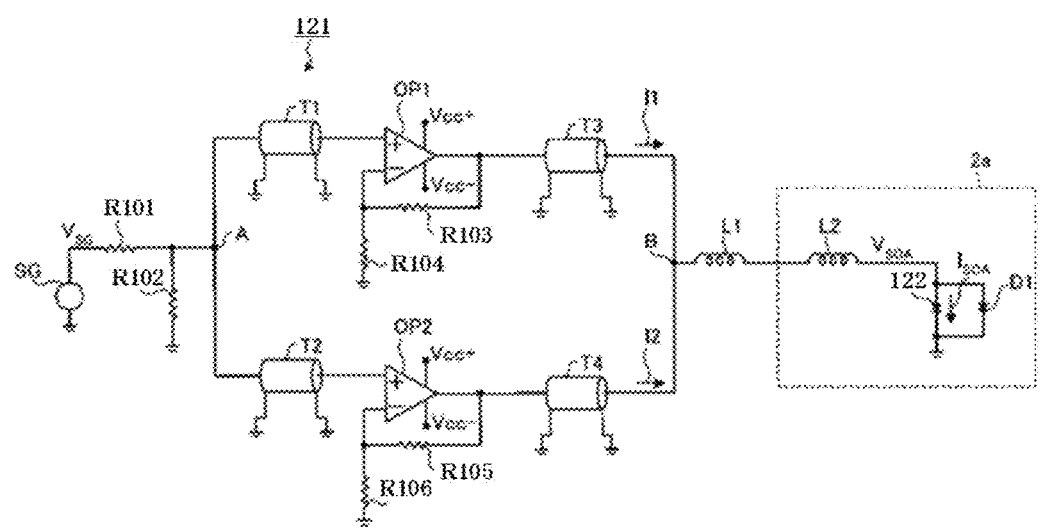
FIG. 14 is a representative diagram of patent literature 1.
Figure 15:
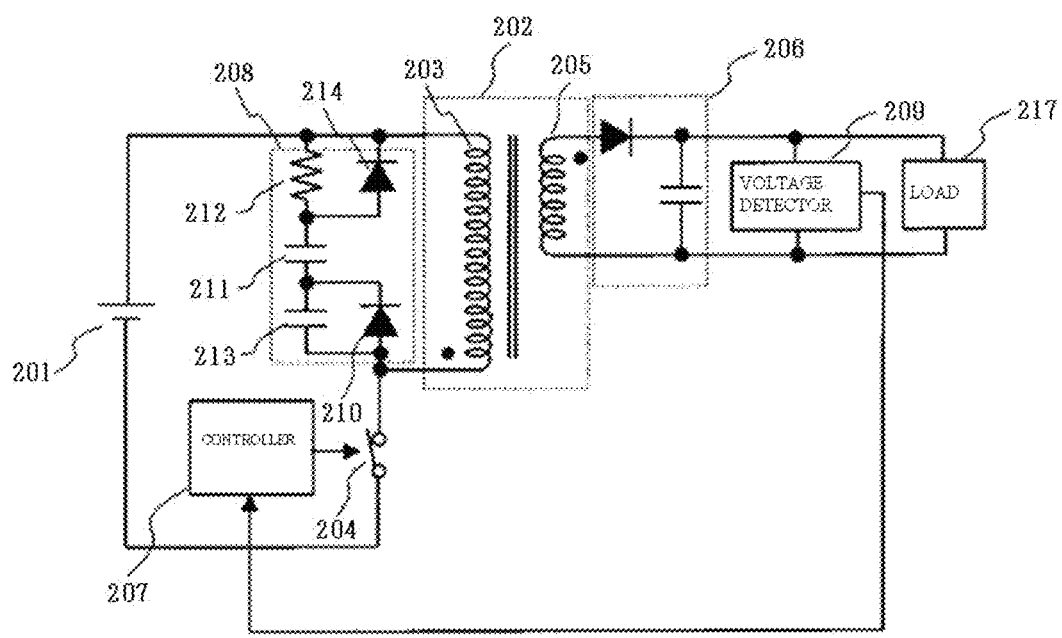
FIG. 15 is a representative diagram of patent literature 2.
Figure 16:
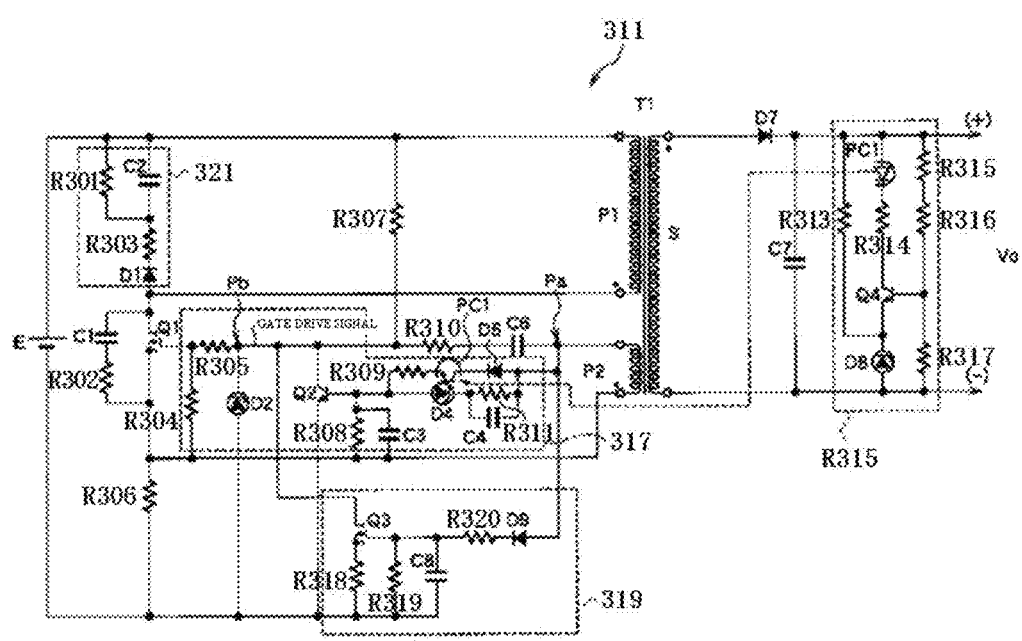
FIG. 16 is a representative diagram of patent literature 3.
Figure 17:
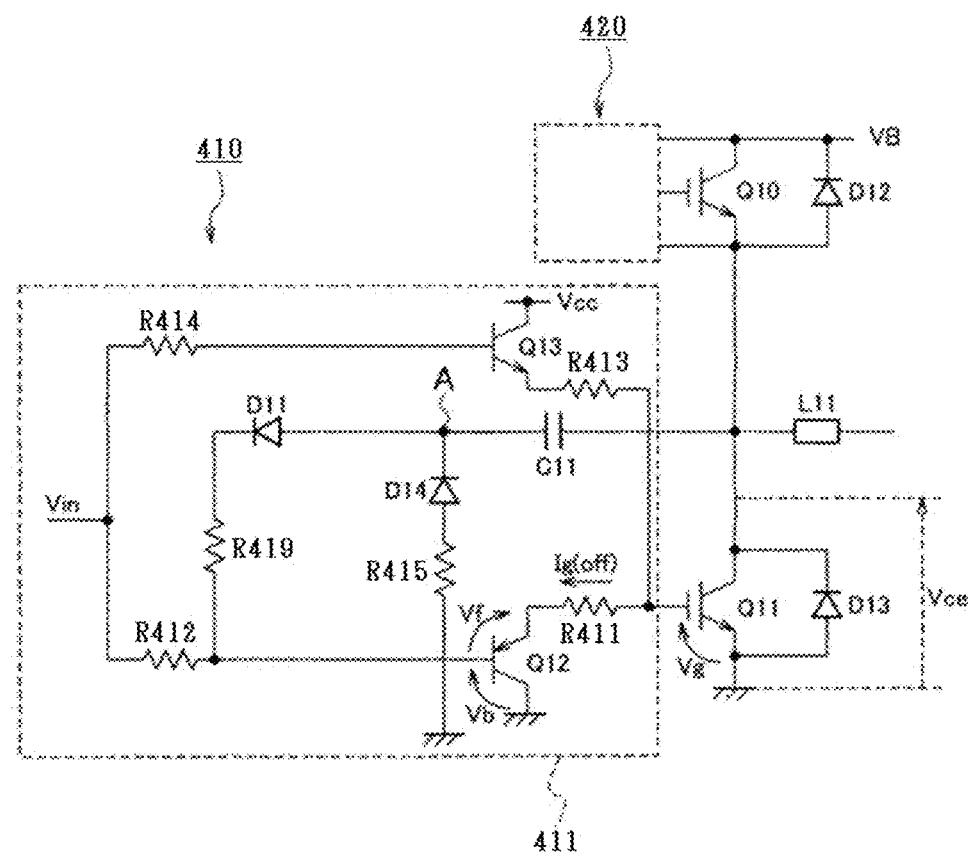
FIG. 17 is a representative diagram of patent literature 4.
Figure 18:
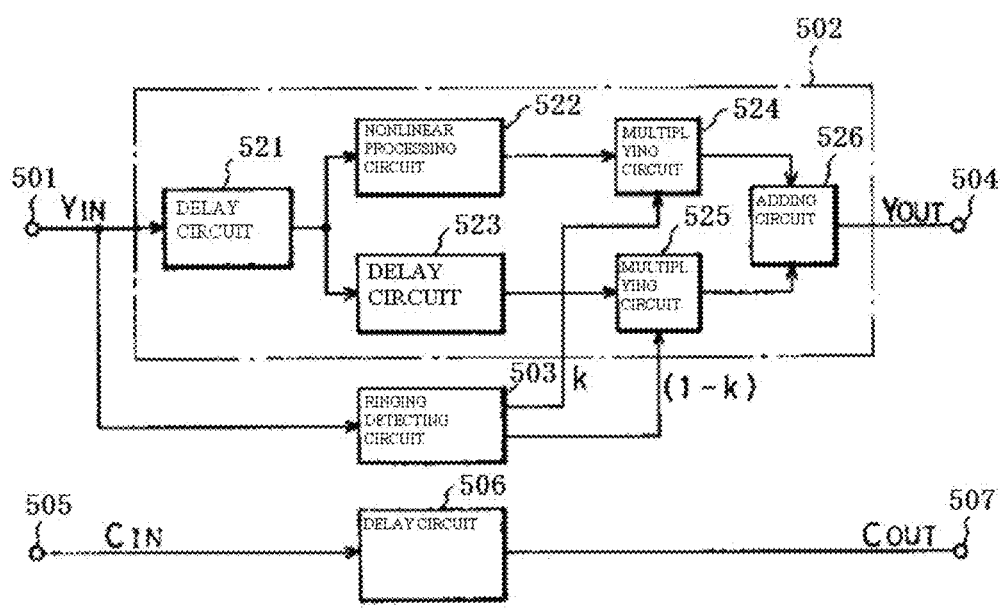
FIG. 18 is a representative diagram of patent literature 5.

In a display device, to generate a power supply of various ICs such as a driver IC for driving the display device and a timing controller, a power supply circuit (DC/DC converter) receiving single input voltage and generating power supplies of a plurality of various ICs is used. A block diagram of the general display device is illustrated in FIG. 13.

Generally, in the case of a booster circuit or a step-down circuit, the DC/DC converter is constructed by parts or elements such as an inductor 4 (L), a rectifier diode 6 (D), a field effect transistor (FET), and a smoothing capacitor (C).

A DC/DC converter circuit (booster circuit) illustrated in FIG. 1 will be described using input voltage as $V_{IN}$ and output voltage as $V_{OUT}$.

Figure 1:
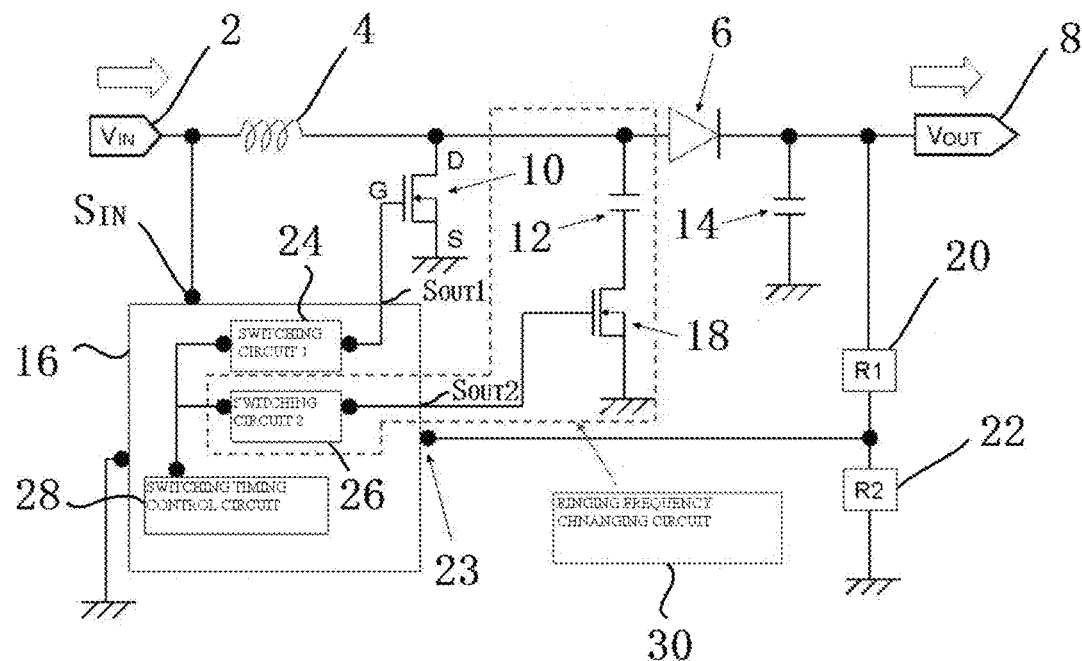
FIG. 1 is a diagram illustrating a configuration example of a ringing frequency changing circuit of a first embodiment of the present invention.

In FIG. 1, the DC/DC converter of the present invention has the inductor 4 and the rectifier diode 6 which are connected in series to a signal input terminal $V_{IN}$ 2, and an output of the $V_{IN}$ 2 is connected to an input $S_{IN}$ of a DC/DC oscillation IC 16. To the other end of the inductor 4, not only the rectifier diode 6 but also the drain of a switching FET 10 and a capacitor R 12 are connected.

An output of the rectifier diode 6 is connected not only to $V_{OUT}$ 8 but also a smoothing capacitor 14 and an F/B detection divider R1 (20). The other end of the capacitor R 12 is connected to the drain of an FET-R 18.

The source of the switching FET 10, the source of the FET-R 18, and the other end of the smoothing capacitor 14 are connected to GND. The other end of the resistor R1 (20) of the F/B detection divider is connected to a resistor R2 (22) of the F/B detection divider and an F/B terminal 23 of the DC/DC oscillation IC 16.

On the other hand, the DC/DC oscillation IC 16 has a switching circuit 1 (24), a switching circuit 2 (26), and a switching timing control circuit 28, and the switching timing control circuit 28 is connected to each of the switching circuit 1 (24) and the switching circuit 2 (26).

An output $S_{OUT}1$ of the switching circuit 1 (24) is connected to the gate of the switching FET 10, and an output $S_{OUT}2$ of the switching circuit 2 (26) is connected to the gate of the switching FET 10.

As the operation of the DC/DC converter, when the input voltage $V_{IN}2$ is received, energy is charged in the inductor 4, the gate of the switching FET is opened in cycles determined in the switching circuit 1 (24) of the oscillation IC 16, on/off operation of a booster line is repeated, a voltage higher than input voltage is generated in the case of the booster circuit configuration, rectification is performed so that current flows in one direction in the rectifier diode 6, and stable voltage is obtained in the smoothing capacitor 14 and output as output voltage.

In the circuit configuration, output voltage is always monitored so that the output voltage does not become higher than assumed voltage, and a voltage divided value of output voltage is fed back as feedback (F/B) voltage to the oscillation IC 16. The output voltage value is monitored by an error amplifier existing in the oscillation IC 16. In the oscillation IC 16, in the case where the output voltage becomes high, it is adjusted to be lowered and, in the case where the output voltage becomes low, it is adjusted to become higher, so that assumed predetermined voltage is always obtained.

In the above-described circuit configuration, voltage suddenly changes at the on/off timing of the switching FET 10 so that undershoot or overshoot of voltage occurs, and this causes ringing (voltage fluctuation which occurs until undershoot or overshoot converges) occurs.

A capacitor for changing a frequency component in the ringing which occurs is inserted between the drain and the source (hereinbelow, called between D and S) of the switching FET 10. When the capacitor is inserted between the source and the drain of the switching FET, the capacitor always operates at both of the rising and falling times of the switching waveform. When the switching waveform becomes dull, the efficiency of the power supply (DC/DC converter) deteriorates.

Consequently, in order to perform control so that the capacitor between D and S of the switching FET operates only for a period necessary to change only the ringing frequency component mainly exerting influence on deterioration in the EMI, a ringing frequency changing circuit 30 and the switching circuit 2 (26) for driving it are provided (refer to FIG. 1).

As illustrated in FIG. 1, the ringing frequency changing circuit 30 is constructed by the FET-R 18, the capacitor R 12, and the switching circuit 2 (26).

Next, EMI radiation of the printed board will be described. There is the case where the printed board having a ringing frequency component at the rising/falling time of the oscillation circuit part of the DC/DC converter generates large radiation when the resonance frequency of the printed board and the ringing frequency component match. Particularly, there are cases such that the GND area is not sufficiently assured like in a two-layer substrate and that radiation is amplified by interference with a peripheral structure (such as a casing plate).

To prevent increase in the EMI radiation, it is important to make the ringing frequency component deviated from the resonance frequency band of the printed board.

Generally, resonance frequency fmn of a printed board is expressed by the following equation (a).

$$fmn = \{c/(2\pi\sqrt{(\epsilon r)})\} \times \sqrt{((m\pi/a)^2 + (n\pi/b)^2)} \qquad \text{Equation (a)}$$

c: velocity of light $3.0 \times 10^8$ (m/s)
∈r: dielectric constant of printed board
a: length in the horizontal direction of printed board
b: length in the vertical direction of printed board
m, n: integers Although the resonance frequency of the printed board is calculated as a frequency value from the equation (a), the value is a peak value (the point where resonance is the largest), and there is a certain margin (referred to as "fb") a center of which is the calculated resonance frequency.

In the case where the ringing frequency fr which is originally generated lies in the range of the resonance frequency band fmn±fb of the printed board like as expressed by the following equation (b), large radiation is generated.

$$fmn-fb < fr < fmn+fb \qquad \text{Equation (b)}$$

When the ringing frequency which is originally generated is set as "fr" and the ringing frequency which is changed by operating the capacitor by the present invention is set as "frc", the capacitor operates and it makes the waveform dull, so that the ringing frequency is changed to be lowered. The frequency is expressed by the following equation (c).

$$frc < fr \qquad \text{Equation (c)}$$

In the case where the equation (b) is satisfied and large radiation is accordingly generated, it is sufficient to change the ringing frequency so that the following equation (d) is satisfied.

$$frc < fmn-fb \qquad \text{Equation (d)}$$

By making the resonance frequency band of the printed board and the frequency band of the ringing frequency component deviated from each other in such a manner, EMI radiation can be reduced.

Next, the configuration of a first embodiment will be described with reference to FIG. 1. As the configuration of the present invention, a booster-type DC/DC converter will be used as an example. First, when the power supply is turned on, the switching circuit 1 (24) starts driving to drive the switching FET 10, and voltage higher than input voltage is generated as output voltage.

Regarding concrete operation of each of circuit elements, when input voltage $V_{IN}$ 2 is input, energy is charged in the inductor 4, the gate of the switching FET 10 is opened in determined cycles by the switching circuit 1 (24) of the oscillation IC 16, and the on/off operation of a booster line is repeated. In the case of a booster circuit configuration, voltage higher than the input voltage is generated, rectification is performed by the rectifier diode 6 so that current flows in one direction, and stable voltage is obtained in the smoothing capacitor 14 and is output as output voltage.

In the circuit configuration, the output voltage is always monitored so as not to be higher than assumed voltage, and the value of divided voltage of the output voltage (voltage obtained by dividing the output voltage value by the resistor R1 (20) and the resistor R2 (22) of the F/B detection divider) is fed back to the DC/DC converter oscillation IC 16. The output voltage value is monitored by the not-illustrated error amplifier existing in the oscillation IC 16. When the output voltage becomes high, it is adjusted to become lower and, when the output voltage becomes low, it is adjusted to become higher in the oscillation IC 16. Consequently, the assumed predetermined voltage is always obtained.

As a characteristic of the present invention, the ringing frequency changing circuit 30 is provided to make the capacitor provided between D and S of the switching FET 10 valid only in a determined period is provided.

For example, as illustrated in FIG. 1, the ringing frequency changing circuit 30 is constructed by the capacitor R 12, the FET-R 18, and the switching circuit 2 (26).

Next, the operation of the first embodiment will be described with reference to FIGS. 1 to 7. As illustrated in FIG. 1, when the voltage of $V_{IN}$ 2 is supplied and the DC/DC converter oscillation IC 16 starts operating, first, the switching circuit 1 (24) for turning on/off the switching FET 10 is driven. An oscillation waveform (rectangular wave) is generated in predetermined cycles, and the switching FET 10 starts on/off operation.

A case where the ringing frequency is not changed, that is, the normal DC/DC converter is driven will be considered here.

Figure 2:
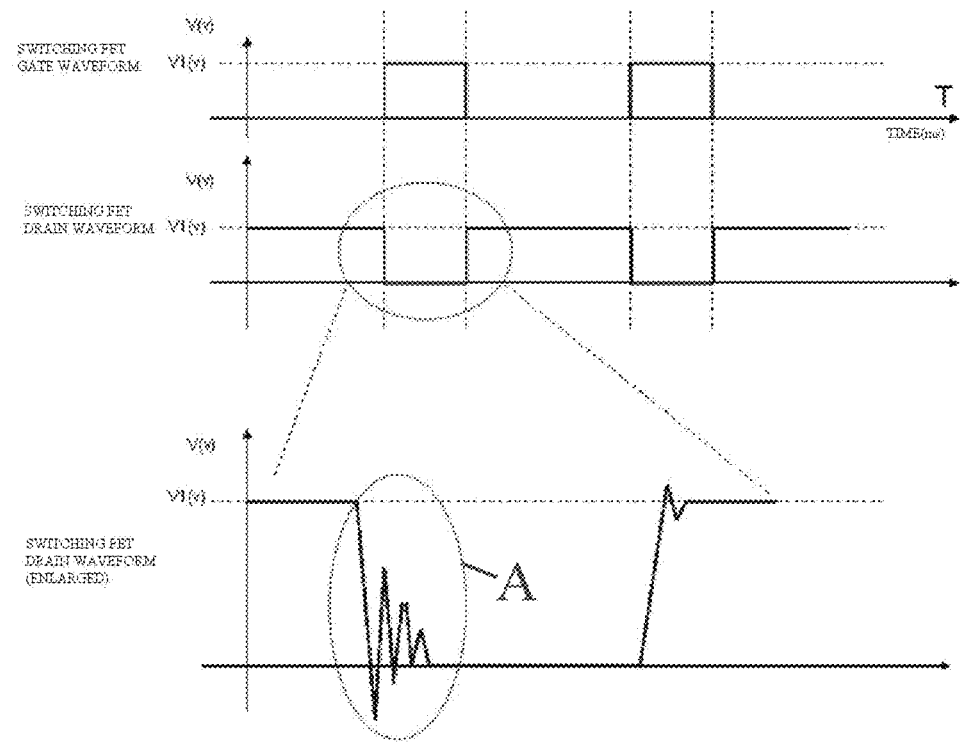
FIG. 2 is a diagram illustrating an example of conventional switching waveforms (in which the ringing frequency changing circuit is not provided).

Since the switching FET 10 is momentarily on/off operated by high voltage and the ground voltage by the switching circuit 1 (24), the voltage fluctuation of undershoot or overshoot occurs at the falling or rising time of the switching waveform (refer to FIG. 2).

The voltage fluctuation repeats until the voltage converges to predetermined voltage (output potential or GND potential). The voltage fluctuation is ringing. When a frequency component which worsens EMI is included in the ringing, it causes deterioration in EMI.

The example will be described on assumption that, as illustrated in FIG. 2, a frequency component exerting large influence on deterioration in EMI at the falling time of the switching waveform. Top graph of FIG. 2 illustrated a switching FET GATE WAVEFORM. Middle graph of FIG. 2 illustrated a switching FET DRAIN WAVEFORM. Under graph of FIG. 2 illustrated enlarged Middle graph of FIG. 2. Symbol A means that large ringing occurs at falling time.

Figure 3:
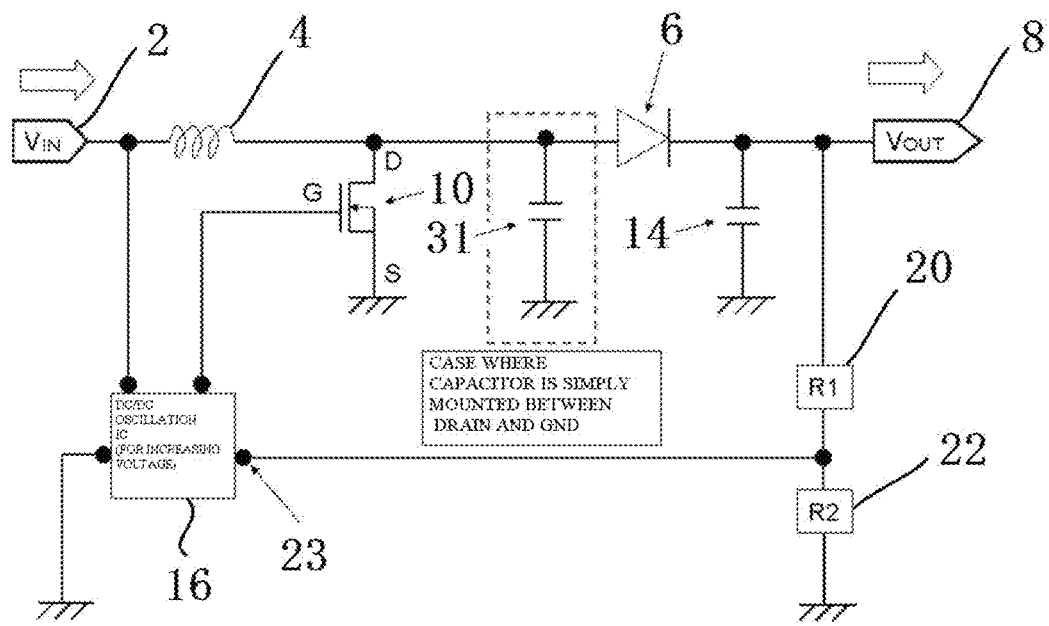
FIG. 3 is a diagram illustrating a circuit example in which only a capacitor is inserted between the drain and the source of a switching FET.

Next, to reduce deterioration in EMI, the case of simply inserting only a capacitor 31 between D and S of the switching FET 10 for the purpose of making the ringing frequency sufficiently deviated from the resonance frequency of the printed board or the standard frequency of EMI radiation (30 MHz or less in VCCI) will be considered (refer to FIG. 3). Symbol R1(20) and Symbol R2(22) are F/B DETECTION DIVIDER.

Figure 4:
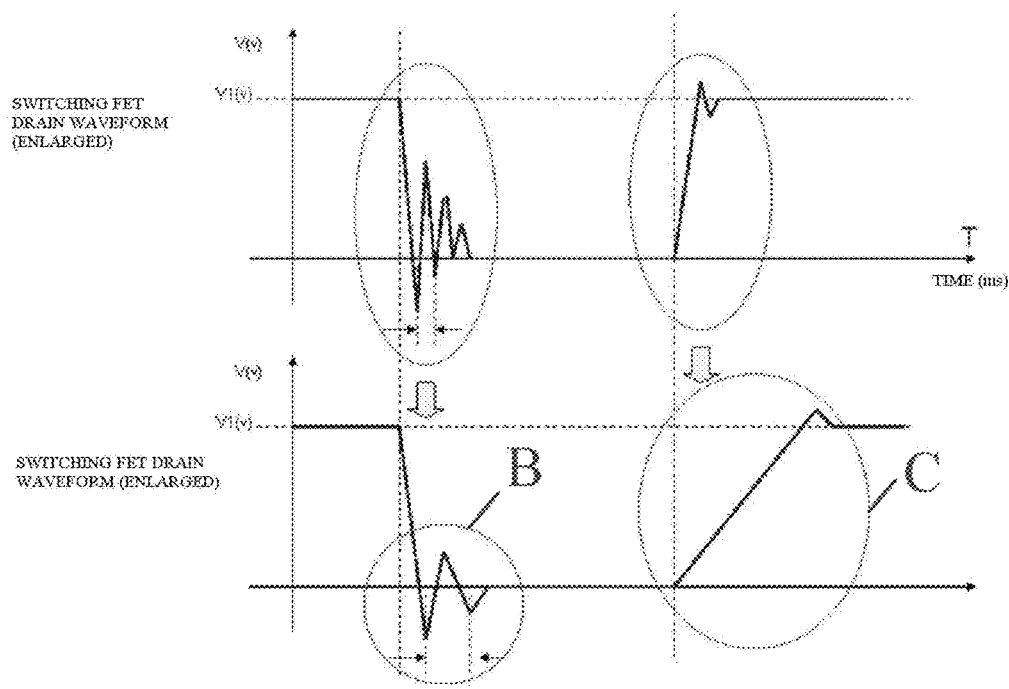
FIG. 4 is a diagram illustrating an example of switching waveforms in the case where only a capacitor is inserted between the drain and the source of a switching FET.

FIG. 4 illustrates the operation of the switching waveform at this time. It is understood from FIG. 4 that the ringing frequency at the falling is changed to be lowered by insertion of the capacitor, but dullness of the waveform at the rising time simultaneously increases. Symbol B means that ringing frequency changes (decreases) EMI radiation frequency changes. Symbol C means that rising waveform becomes dull efficiency deterioration.

In the operation of the switching waveform, although the radiation frequency of EMI can be changed to be decreased, the rising waveform becomes simultaneously dull, so that efficiency of the DC/DC converter deteriorates.

Figure 5:
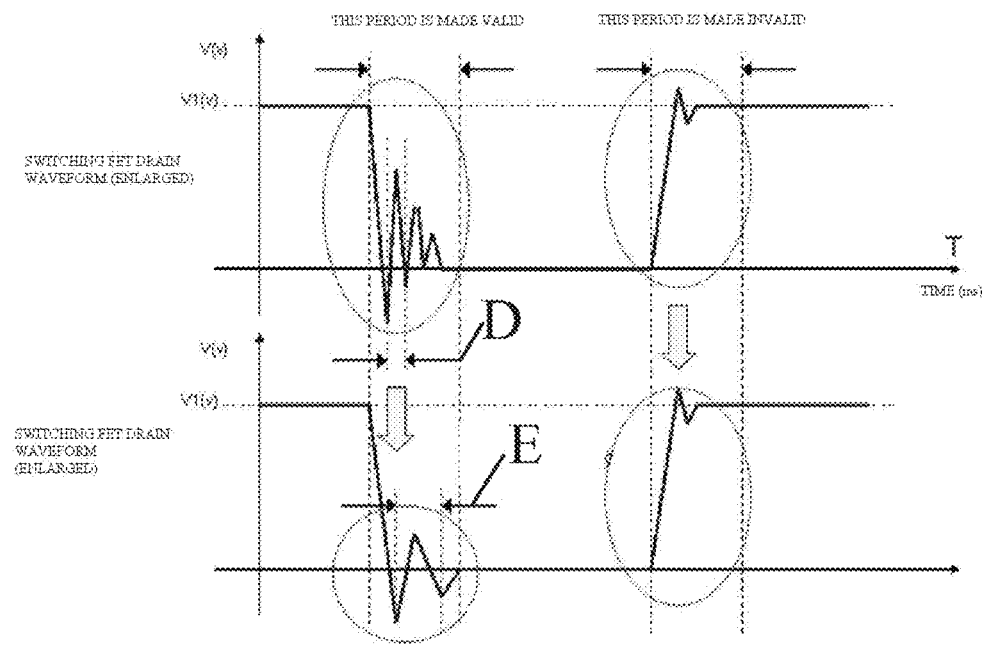
FIG. 5 is a diagram illustrating an example of switching waveforms at the time of driving the ringing frequency changing circuit of the first embodiment of the present invention.
Figure 6:
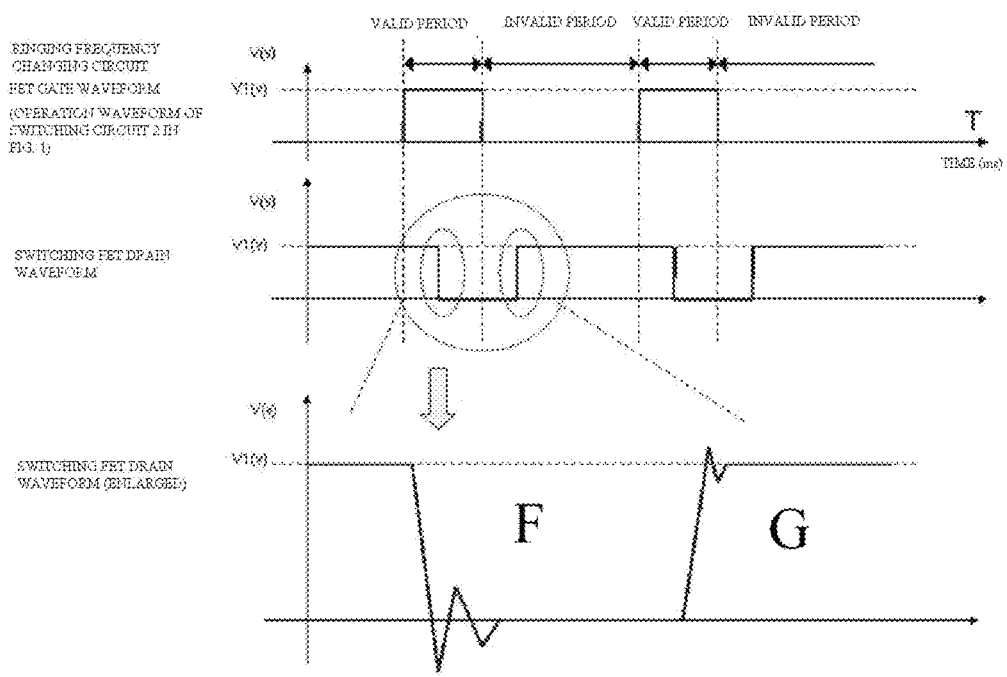
FIG. 6 is a diagram illustrating an example of a switching waveform controlling method at the time of driving the ringing frequency changing circuit of the first embodiment of the present invention.

Therefore, it is ideal to minimize efficiency deterioration and sufficiently reduce the EMI level, so that a circuit configuration capable of realizing the operation as illustrated in FIG. 5 is desirable. Symbol D means that an interval of both arrows is before change in ringing frequency. Symbol E means that an interval of both arrows is after change in ringing frequency. FIG. 6 illustrates a control method for realizing the operation. Symbol F means "at falling time, ringing frequency changes(decreases) EMI radiation frequency changes". Symbol G means that no change at rising time".

In this case, first, when the voltage on the drain side of the switching FET 10 decreases from high voltage to the GND level (the switching FET 10 is turned on), the capacitor between D and S of the switching FET 10 is made valid to change the ringing frequency so as to be lowered. When the voltage on the drain side of the switching FET 10 increases from the GND level to high voltage (the switching FET 10 is turned off), the capacitor between D and S of the switching FET 10 is made invalid to control so that the switching waveform does not become dull at the rising timing.

With respect to the control timing of the switching circuit, at the time point when the drain-source voltage of the switching FET 10 for boosting (step-down) shifts from the high potential side to the low potential side and reaches the low potential, that is, at the time point when the voltage reaches the GND level at the falling timing of the switching waveform, the capacitor is connected between the drain and the source of the switching FET 10. In a period that the switching FET 10 for boosting (step-down) shifts from the low potential side to the high potential side (the rising period of the switching waveform), the capacitor is not connected between the drain and the source of the switching FET 10.

In the example, it is assumed that the frequency component exerting influence on deterioration in EMI is not included at the rising timing of the switching waveform and, obviously, the ringing frequency component which is not connected to deterioration in EMI is not changed.

Figure 7:
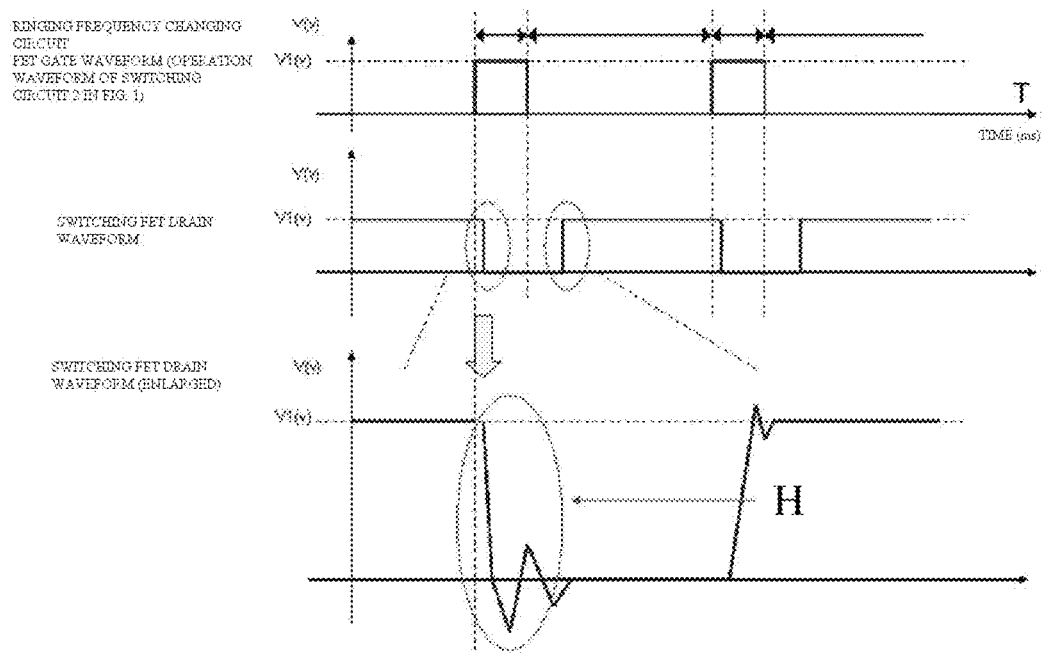
FIG. 7 is a diagram illustrating an example of a switching waveform controlling method at the time of driving the ringing frequency changing circuit of the first embodiment of the present invention.

To prevent the switching waveform at the falling timing from becoming dull as much as possible, a method of making the capacitor between D and S of the switching FET valid very close to the GND level by using the control method as illustrated in FIG. 7 may be used. By the method, the efficiency deterioration can be further decreased. Symbol H means "in period of operating capacitor at falling time, circuit may be valid just before undershoot in consideration of rising time of FET gate".

Description has been given on assumption that the frequency component which worsens EMI is included in the falling of the switching waveform. In the case where the frequency component which worsens EMI is included in the rising of the switching waveform, it is sufficient to operate the switching circuit 2 (26) so that the capacitor between D and S of the switching FET becomes valid only in the rising for the same reason described above.

With respect to the control timing of the switching circuit in this case, at the time point when the drain-source voltage of the switching FET 10 for increasing (decreasing) voltage shifts from the low potential side to the high potential side and reaches the high potential, that is, at the time point when the voltage reaches the $V_{OUT}$ level at the rising timing of the switching waveform, the capacitor is connected between the drain and the source of the switching FET 10. In a period that the switching FET 10 for increasing (decreasing) voltage shifts from the high potential side to the low potential side (the falling period of the switching waveform), the capacitor is not connected between the drain and the source of the switching FET 10.

The degree of lowing the ringing frequency to sufficiently reduce the EMI level will now be described.

First, the ringing frequency component is deviated sufficiently from the resonance frequency band of the printed board and, further, from the frequency band of the EMI radiation standard (for example, 30 MHz or less in VCCI).

When a printed board having characteristics that, concretely, $\in r=4.5$, a=436 (mm), and b=89.1 (mm) is considered as an example for the resonance frequency of the printed board, the resonance frequency fmn of the printed board can be calculated as 162 MHz from the equation (a).

Therefore, the ringing frequency has to be changed to be sufficiently lower than 162 MHz as the peak value of the resonance frequency of the printed board.

Since a target frequency (MHz) of a deviation is related also to the spectrum width of the resonance frequency of the printed board and other conditions (such as the GND area of the printed board and the frame GND for the printed board), it is sufficient to select the constant of the capacitor by which the EMI level can be sufficiently reduced at the time of evaluating EMI.

Using a substrate of this size as an example, by inserting a capacitor of about 1000 pF or larger between D and S of the switching FET in the booster circuit part, the EMI level caused by switching of the booster circuit part can be sufficiently reduced. That is, as shown in Table 2 to be described later, by inserting a capacitor of 1000 pF, the ringing frequency of about 200 MHz is decreased to about 45 MHz, so that the value is sufficient.

By effectively changing the frequency component of the ringing which exerts adverse influence on EMI which occurs in the case of driving the DC/DC converter as described above, the efficiency deterioration is minimized and EMI can be reduced.

Concrete effects of the first embodiment will be described. As described above, regarding the capacitance of the capacitor inserted between D and S of the switching FET, simple insertion makes the efficiency of the DC/DC converter deteriorate.

Hereinafter, a result of comparison of efficiencies of the DC/DC converter among the case of simply inserting the capacitor between the D and S of the switching FET, the case of inserting no capacitor, and the case of performing control by using the control method of the present invention will be described. The oscillation frequency in this case is 740 kHz.

TABLE 1

DC/DC converter driving conditions 1

| Various conditions of DC/DC converter | Value (V) |
| --- | --- |
| Input voltage ($V_{IN}$) | 10.6 |
| DC/DC converter output voltage (booster circuit) | 14.5 |

TABLE 2

Comparison table 1 of capacitance of capacitor (between D and S) of switching FET and DC/DC converter efficiency

| Capacitance of capacitor | State of capacitor (between D and S) of switching FET | Consumption current (mA) | Efficiency (%) | Ringing frequency component (MHz) *representative value |
| --- | --- | --- | --- | --- |
| 560 pF | Without capacitor | 549.58 | 82.4 | 210.5 |
|  | Capacitor always operating | 551.93 | 82.0 | 71.4 |
|  | With capacitor control | 550.38 | 82.3 | 71.4 |
| 1000 pF | Without capacitor | 549.63 | 82.4 | 210.5 |
|  | Capacitor always operating | 554.86 | 81.6 | 45.5 |
|  | With capacitor control | 550.25 | 82.3 | 45.5 |
| 1500 pF | Without capacitor | 549.62 | 82.4 | 200.0 |
|  | Capacitor always operating | 558.58 | 81.0 | 38.5 |
|  | With capacitor control | 550.21 | 82.3 | 38.6 |
| 2200 pF | Without capacitor | 549.59 | 82.4 | 210.5 |
|  | Capacitor always operating | 564.80 | 80.2 | 25.0 |
|  | With capacitor control | 550.34 | 82.3 | 25.0 |

Table 2 shows a result of measuring efficiency in various states of the capacitor in the DC/DC converter (for a liquid crystal display device) driven under the conditions of Table 1.

Regarding the state of the capacitor (between D and S) of the switching FET in Table 2, "without capacitor" means that there is no capacitor (between D and S) of the switching FET, "capacitor always operating" expresses the circuit configuration illustrated in FIG. 3 and refers to a state where the capacitor is simply inserted (between D and S) in the switching FET, and "with capacitor control" refers to the circuit configuration of FIG. 1 described in the first embodiment of the present invention.

Figure 11:
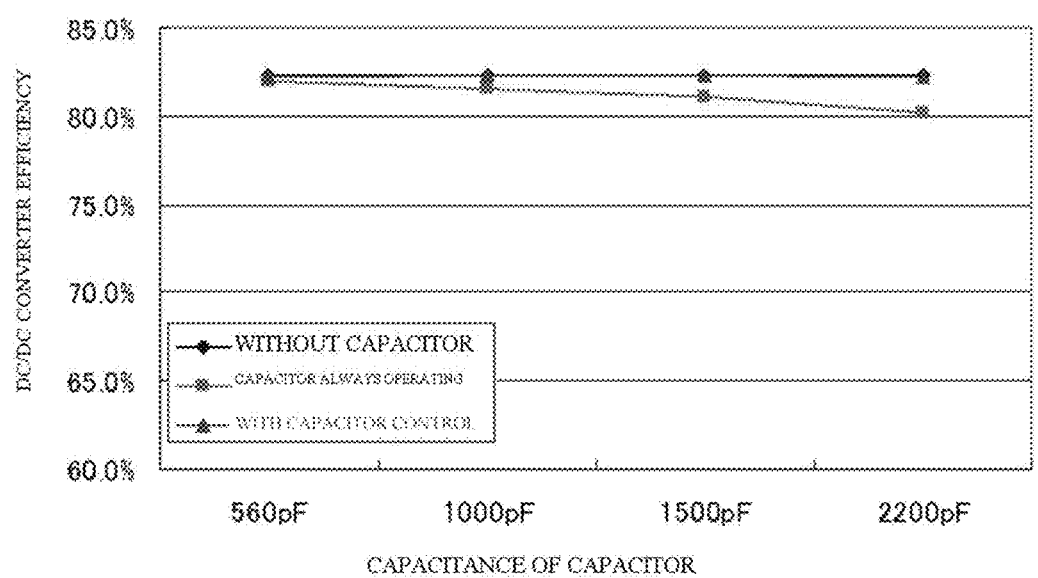
FIG. 11 is a diagram illustrating an example of a state of each capacitor between the drain and the source of a switching FET under a DC/DC converter driving condition 1 and deterioration in efficiency.

FIG. 11 is a graph of deterioration in efficiency of the DC/DC converter in each of the above-described circuit configurations.

As understood from Table 2 and FIG. 11, as compared with the state where there is no capacitor, the efficiency of the DC/DC converter in the case where the capacitor is simply inserted between D and S of the switching FET ("capacitor always operating") deteriorates by 0.4% at 560 pF, 0.8% at 1000 pF, 1.4% at 1500 pF, and 2.2% at 2200 pF. Obviously, the larger the capacitance is, the larger the efficiency deterioration becomes.

On the other hand, when the control is performed to drive the capacitor only for a necessary period ("with capacitor control"), it is understood that the efficiency deterioration is about 0.1% at each of capacitances.

The ringing frequency components (representative values) are shown in Table 2. There are a number of ringing frequency components which are generated by the on/off operation of the switching FET and, therefore, the ringing frequency components are generated as base noise in a wide bandwidth (normally, the base noise occurs in a wide bandwidth of tens MHz to hundreds MHz). It can be confirmed that by inserting the capacitor, the base noise is reduced.

In such a manner, by making the capacitor between D and S of the switching FET valid only for a necessary period, the efficiency deterioration is minimized, and the ringing frequency component exerting influence on the EMI can be effectively changed.

In the example of the experiment result of Table 1, the difference between the input voltage and the output voltage generated by the booster circuit is 14.55V/10.6V=1.37 times and is not so large. Even in the case of simply inserting 1000 pF between D and S of the switching FET, efficiency deterioration is only about 0.8%. However, for example, in the case where the voltage difference is larger and in the case such that the switching frequency is higher, only by simply inserting the capacitor, the efficiency deterioration becomes noticeable.

Table 3 illustrates an example of the efficiency deterioration in the case of simply inserting the capacitor between D and S of the switching FET when the difference between the output voltage of the booster circuit of the DC/DC converter and the input voltage is large. The oscillation frequency in this case is 1350 kHz.

TABLE 3

DC/DC converter driving conditions 2

| Various conditions of DC/DC converter | Value (V) |
|---|---|
| Input voltage ($V_{IN}$) | 3.3 |
| DC/DC converter output voltage (booster circuit) | 12.0 |

TABLE 4

Comparison table 2 of capacitance of capacitor (between D and S) of switching FET and DC/DC converter efficiency

| Capacitance of capacitor | State of capacitor (between D and S) of switching FET | Consumption current (mA) | Efficiency (%) | Ringing frequency component (MHz) *representative value |
|---|---|---|---|---|
| 560 pF | Without capacitor | 271 | 78.7 | 500 |
| | Capacitor always operating | 289 | 73.8 | 45.4 |
| | With capacitor control | 275 | 77.6 | 45.4 |
| 1000 pF | Without capacitor | 271 | 78.7 | 500 |
| | Capacitor always operating | 307 | 69.5 | 35.7 |
| | With capacitor control | 276 | 77.3 | 35.7 |
| 1500 pF | Without capacitor | 271 | 78.7 | 500 |
| | Capacitor always operating | 321 | 66.4 | 26.3 |
| | With capacitor control | 278 | 76.8 | 26.3 |
| 2200 pF | Without capacitor | 271 | 78.7 | 500 |
| | Capacitor always operating | 344 | 62.0 | 21.7 |
| | With capacitor control | 279 | 76.5 | 21.7 |

Figure 12:
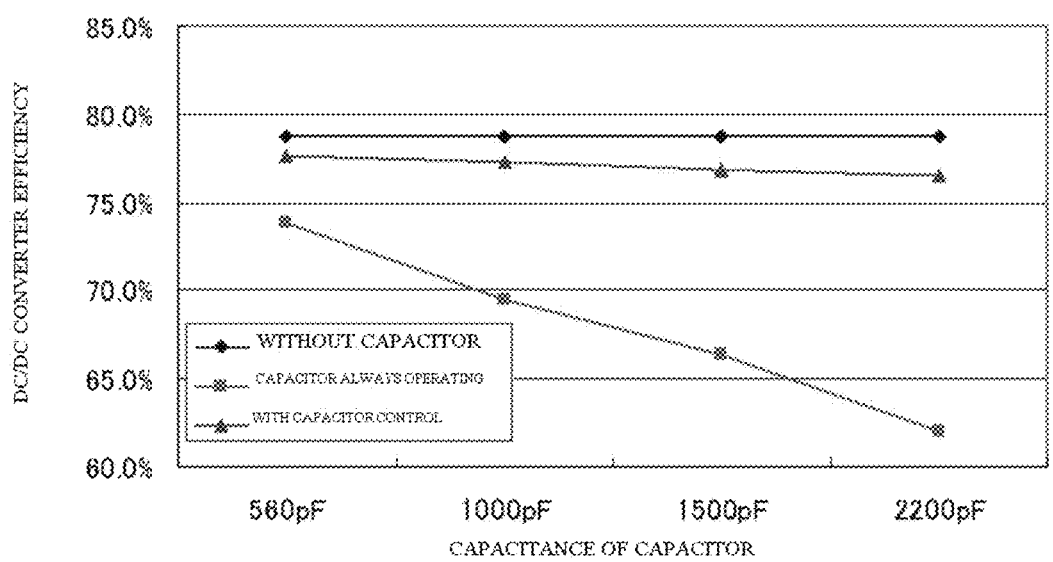
FIG. 12 is a diagram illustrating an example of a state of each capacitor between the drain and the source of a switching FET under a DC/DC converter driving condition 2 and deterioration in efficiency.

At this time, a result of measurement of efficiency in the case where the difference between the output voltage of the DC/DC converter and the input voltage is 12.0V/3.3V=3.64 times. FIG. 12 is a graph illustrating a state of efficiency deterioration like in FIG. 11.

As understood from Table 4 and FIG. 12, the efficiency deteriorates by 4.9% in the case where 560 pF is simply inserted between D and S of the switching FET. The efficiency deteriorates by 16.7% when 2200 pF is inserted. On the other hand, the efficiency deterioration in the circuit configuration with the capacitor control is reduced to 1.1% when 560 pF is inserted and to 2.2% when 2200 pF is inserted.

Therefore, in the case where the output voltage generated by the booster circuit of the DC/DC converter is larger than the input voltage, the efficiency deterioration becomes noticeable, and it is understood that the effect of the present invention is stronger.

There is the possibility that the ringing frequency component in the switching waveform of the DC/DC converter worsens the base noise of EMI as described above and, when the ringing frequency component overlaps peak noise or the like, deviates from the standard of the EMI.

Since it is a necessary condition that the display device satisfies the EMI standard, when deterioration in efficiency of the DC/DC converter is caused as a result of taking a measure to EMI, current consumption is increased and, in addition, there is the possibility that adverse influence is exerted on increase in rush current, derating of parts of the DC/DC converter, and the like, so that deterioration in efficiency has to be minimized. Therefore, it is effective to minimize the efficiency deterioration and reduce EMI as in the present invention.

Second Embodiment

In the first embodiment, the example of controlling the switching circuit 1 (24) and the switching circuit 2 (26) by using the timing control circuit 28 and driving the ringing frequency changing circuit 30 has been described. In a second embodiment, an example of construction using a simple delay circuit, not the timing control circuit 28, will be described.

Figure 8:
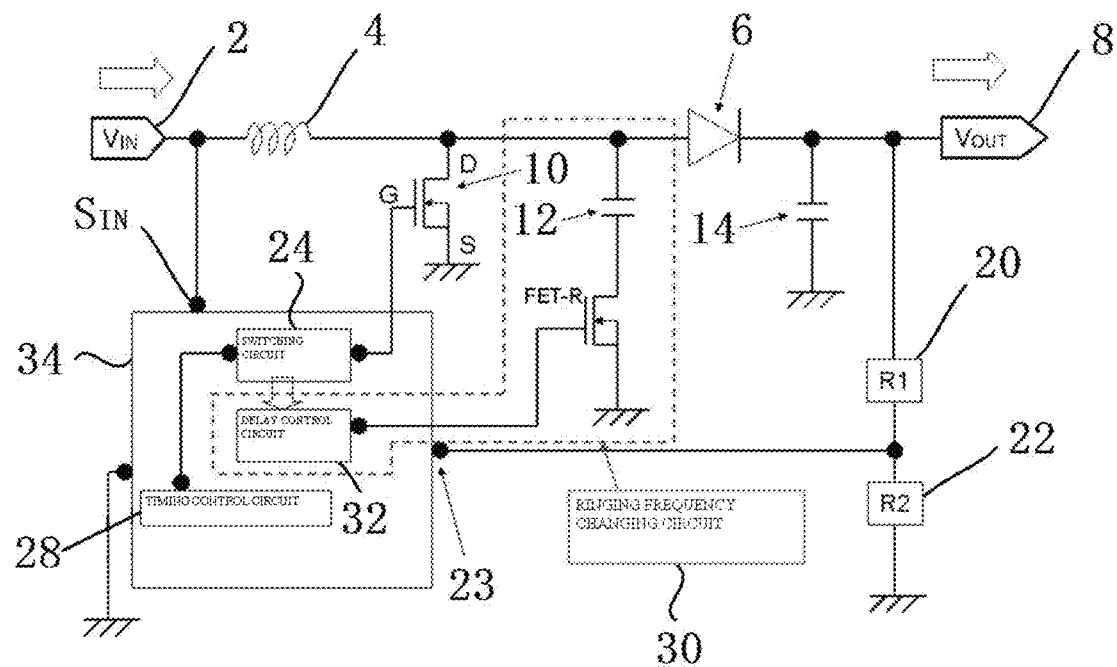
FIG. 8 is a diagram illustrating a configuration example of a ringing frequency changing circuit (delay circuit) of a second embodiment of the present invention.
Figure 9:
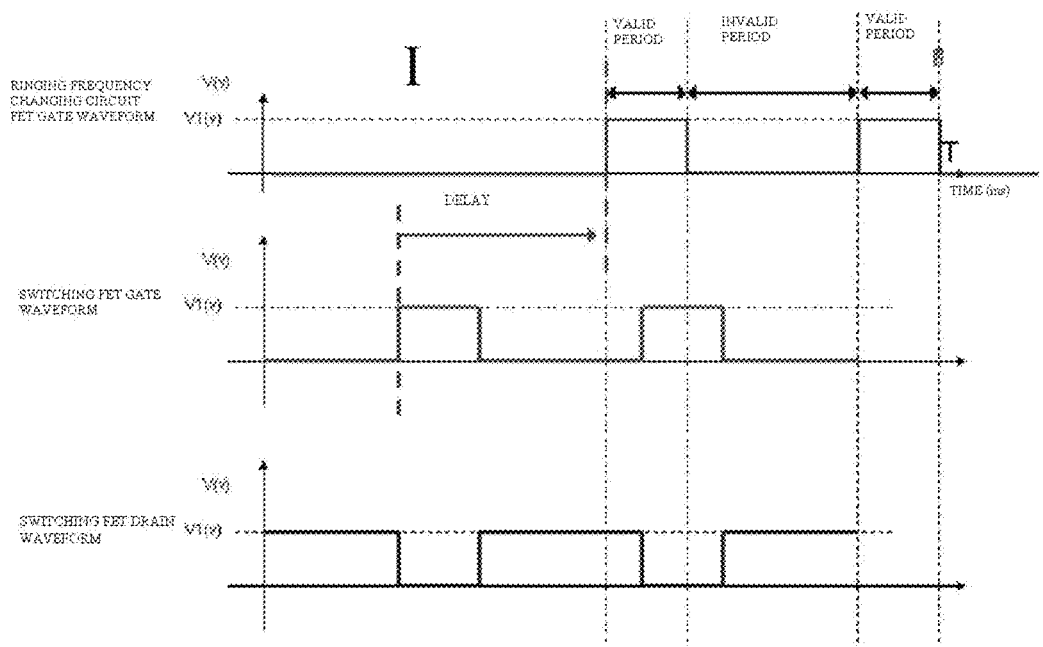
FIG. 9 is a diagram illustrating an example of a switching waveform controlling method at the time of driving the ringing frequency changing circuit of the second embodiment of the present invention.

FIG. 8 is a circuit configuration diagram. By the operation, as illustrated in FIG. 9, a waveform delayed by using the timing of the switching circuit is formed.

The point different from FIG. 1 will be mainly described. The largest difference from the first embodiment illustrated in FIG. 1 is a DC/DC oscillation circuit IC (for booster) 34. In the DC/DC oscillation circuit IC (for booster) 34, a delay control circuit (32) is disposed in place of the switching circuit 2 (26). The delay control circuit (32) drives the FET-R 18.

In the configuration of the delay control circuit 32 of the second embodiment, it is unnecessary to prepare two systems of the switching circuits described in the first embodiment, and the delay control circuit 32 can be realized by the simple circuit configuration. The delay control circuit 32 may not be provided on the inside of the DC/DC converter oscillation IC 16 but may be constructed as an external circuit (refer to FIG. 10).

Since the delay control circuit 32 is constructed by using a general logic IC and a display device usually has a timing controller, it can be realized by providing the logic of the delay control circuit 32 in the timing controller.

In the case of constructing the delay control circuit 32 by an external circuit, there is an advantage that versatility of the circuit configuration increases. The other configuration is similar to the first embodiment.

In the first embodiment, the example of controlling the switching circuit 1 (24) and the switching circuit 2 (26) by using the timing control circuit 28 to drive the ringing frequency changing circuit 30 has been described. In the configuration of the second embodiment, only one switching circuit is provided, and the FET-R 18 is driven by a switching waveform obtained by delaying the switching circuit. This part is different from the first embodiment, and the other configuration is the same as that of the first embodiment.

Figure 10:
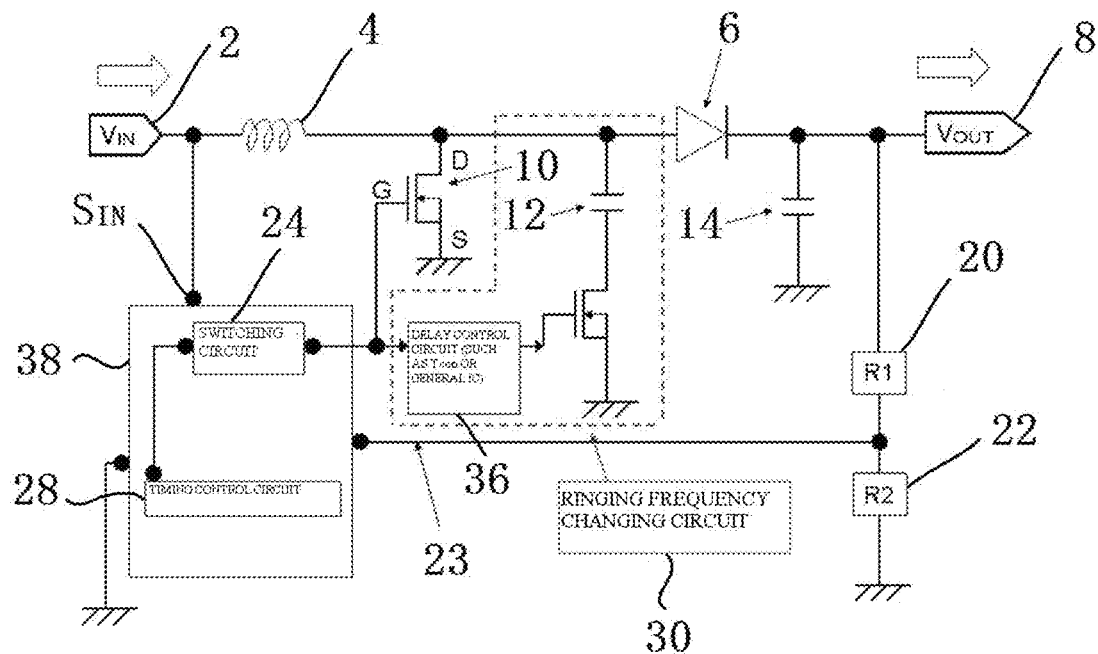
FIG. 10 is a diagram illustrating a second configuration example of the ringing frequency changing circuit (delay circuit) of the second embodiment of the present invention.

The delay control circuit 32 may be constructed in the DC/DC converter oscillation IC 16 as illustrated in FIG. 8 or may be constructed (as an external circuit) on the outside of the DC/DC converter oscillation IC 16 (refer to FIG. 10).

In the case of constructing the delay control circuit 32 as an external circuit, since the delay control circuit 32 is constructed by using a general logic IC and a display device usually has a timing controller, it can be realized by providing the logic of the delay control circuit 32 in the timing controller.

As a concrete method of providing the logic of the delay control circuit 32 in the timing controller, the waveform to be output is adjusted (to simply realize the adjustment, resistance voltage division or the like is used) so as to satisfy the input voltage standard of the timing controller by the switching circuit, the waveform at the same timing as that of the switching circuit is supplied to the timing controller, a delay amount is set by using a counter logic or the like in the timing controller, and the delayed waveform is output from the timing controller, and supplied to the gate of the FET-R 18. The other configuration is similar to that of the first embodiment.

Next, the operation of the second embodiment will be described with reference to FIG. 9. In the first embodiment, output timings of the switching circuit 1 (24) and the switching circuit 2 (26) are controlled by using the switching timing control circuit 28. In the second embodiment, the switching circuit of only one system is provided and the delay control circuit 32 is used (refer to FIG. 8).

First, a switching FET gate waveform for driving the switching FET is output from the switching circuit. A predetermined timing is delayed by the delay control circuit 32 using the waveform as a reference, thereby generating a ringing frequency changing circuit FET gate wavelength as illustrated in the upper stage of FIG. 9. The FET-R 18 is driven by using the waveform, and the capacitor R 12 can be made valid in a valid period, and can be made invalid in an invalid period. Symbol I means that generate FET gate waveform of ringing frequency changing circuit from gate waveform of switching FET.

By making the capacitor R12 valid only in a necessary period as described above, deterioration in the efficiency of the DC/DC converter can be minimized, and EMI can be reduced. The other operations are similar to those of the first embodiment.

As effects of the second embodiment, first, like the effect of the first embodiment, the efficiency deterioration of the DC/DC converter can be minimized, and EMI can be reduced. Further, by providing the delay control circuit unit on the outside of the DC/DC converter oscillation IC 16, there is an advantage that versatility of the circuit configuration increases (the circuit can be configured even in the case where the switching circuit 2 (26) is not provided in the DC/DC converter oscillation IC 16).

What is claimed is:

1. A DC/DC converter comprising:
  a switching circuit for driving a switching FET for increasing or decreasing voltage; and
  a switching circuit for driving a ringing frequency changing circuit,
  wherein one end of a capacitor is connected to a drain of the switching FET for increasing or decreasing voltage,
  the other end of the capacitor is connected to a drain of an FET for the ringing frequency changing circuit,
  a source of the FET for the ringing frequency changing circuit is connected to GND, and
  a control circuit is provided which makes the ringing frequency changing circuit valid so that a ringing frequency becomes low only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

2. The DC/DC converter according to claim 1, wherein the ringing frequency changing circuit includes the capacitor, the FET, and the switching circuit for driving the FET, and
  the control circuit is provided which controls a control timing of the switching circuit so that, at the time point when a drain-source voltage of the switching FET for increasing or decreasing voltage shifts from a high potential side to a low potential side and reaches the low potential, the capacitor is connected between the drain and the source of the switching FET and, in a period that the switching FET for increasing or decreasing voltage shifts from the low potential side to the high potential side, the capacitor is not connected between the drain and the source of the switching FET.

3. The DC/DC converter according to claim 1, wherein the ringing frequency changing circuit includes the capacitor, the FET, and the switching circuit for driving the FET, and
  the control circuit is provided which controls a control timing of the switching circuit so that, at the time point when a drain-source voltage of the switching FET for increasing or decreasing voltage shifts from a low potential side to a high potential side and reaches the high potential, the capacitor is connected between the drain and the source of the switching FET and, in a period that the switching FET for increasing or decreasing voltage shifts from the high potential side to the low potential side, the capacitor is not connected between the drain and the source of the switching FET.

4. A DC/DC converter comprising:
  a switching circuit for driving a switching FET for increasing or decreasing voltage; and
  a switching circuit for driving a ringing frequency changing circuit,
  wherein one end of a capacitor is connected to a drain of the switching FET for increasing or decreasing voltage,
  the other end of the capacitor is connected to a drain of an FET for the ringing frequency changing circuit,
  a source of the FET for the ringing frequency changing circuit is connected to GND,
  the switching circuit for driving the ringing frequency changing circuit is constructed by a delay circuit for delaying a timing by a predetermined period using the switching circuit for driving the switching FET for increasing or decreasing voltage as a reference, and
  a control circuit is provided which makes the ringing frequency changing circuit valid so that a ringing frequency becomes low only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

5. The DC/DC converter according to claim 4, wherein the ringing frequency changing circuit includes the capacitor, the FET, and the switching circuit for driving the FET, and
  the control circuit is provided which controls a control timing of the switching circuit so that, at the time point when a drain-source voltage of the switching FET for increasing or decreasing voltage shifts from a high potential side to a low potential side and reaches the low potential, the capacitor is connected between the drain and the source of the switching FET and, in a period that the switching FET for increasing or decreasing voltage shifts from the low potential side to the high potential side, the capacitor is not connected between the drain and the source of the switching FET.

6. The DC/DC converter according to claim 4, wherein the ringing frequency changing circuit includes the capacitor, the FET, and the switching circuit for driving the FET, and
  the control circuit is provided which controls a control timing of the switching circuit so that, at the time point when a drain-source voltage of the switching FET for increasing or decreasing voltage shifts from a low potential side to a high potential side and reaches the high potential, the capacitor is connected between the drain and the source of the switching FET and, in a period that the switching FET for increasing or decreasing voltage shifts from the high potential side to the low potential side, the capacitor is not connected between the drain and the source of the switching FET.

7. The DC/DC converter according to claim 1, wherein the control circuit makes the ringing frequency changing circuit valid so that a ringing frequency becomes sufficiently lower than resonance frequency of a printed board only in a ringing frequency component exerting large influence on deterioration in EMI in a ringing which occurs at a timing when the switching FET for increasing or decreasing voltage is turned on or at a timing when the switching FET for increasing or decreasing voltage is turned off, and which makes the ringing frequency changing circuit invalid at the other timings.

8. A display device comprising a DC/DC converter according to claim 1.

9. A display device comprising a DC/DC converter according to claim 4.

* * * * *